US012266312B1

(12) United States Patent
Du et al.

(10) Patent No.: US 12,266,312 B1
(45) Date of Patent: Apr. 1, 2025

(54) DISPLAY DRIVING SYSTEM AND DISPLAY DRIVING METHOD

(71) Applicant: HIMAX TECHNOLOGIES LIMITED, Tainan (TW)

(72) Inventors: Wei-Hong Du, Tainan (TW); Chuan-Chien Hsu, Tainan (TW); Han-Shui Hsueh, Tainan (TW); Yen-Hua Lin, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/382,538

(22) Filed: Oct. 23, 2023

(51) Int. Cl.
*G09G 3/3266* (2016.01)

(52) U.S. Cl.
CPC ... *G09G 3/3266* (2013.01); *G09G 2310/0218* (2013.01)

(58) Field of Classification Search
CPC ............... G06F 3/0412; G06F 3/04144; G06F 3/04164; G06F 3/042
See application file for complete search history.

(56) References Cited

U.S. PATENT DOCUMENTS

| | | | | |
|---|---|---|---|---|
| 11,238,802 | B2 * | 2/2022 | Shi | G09G 3/3233 |
| 2011/0193798 | A1 * | 8/2011 | Zhan | G06F 3/044 345/173 |
| 2018/0173923 | A1 * | 6/2018 | Lee | G02F 1/13452 |
| 2020/0051520 | A1 * | 2/2020 | Shan | G09G 3/3696 |

* cited by examiner

*Primary Examiner* — Van N Chow
(74) *Attorney, Agent, or Firm* — Winston Hsu

(57) ABSTRACT

A display driving system, configured to control a scan operation of a display, comprising: a scan control circuit, configured to receive a start position signal and to generate a switch selecting signal according to the scan start position signal; and a scan switch circuit, coupled to the display and the scan control circuit, and comprising a plurality of switches, configured to turn on one of the switches according to the switch selecting signal, to control the display to start the scan operation at a scan start position; wherein the display comprises N scan lines, wherein the scan start position is one of the scan lines.

20 Claims, 12 Drawing Sheets

| | GDRST | SCAN_EN | POS_CH[1:0] |
|---|---|---|---|
| 1st Frame | with low pulse | 1 | POS[1:0] |
| After 2nd Frame | with low pulse | 0 | 11 |

Table A

| POS_CH[1:0] | U | D | POSOUTU[3:0] | POSOUTD[3:0] | OUT |
|---|---|---|---|---|---|
| 00 | 1 | 0 | 0001 | 0000 | OUT1→OUTN |
| 01 | | | 0010 | | OUT(N/3+1)→OUTN |
| 10 | | | 0100 | | OUT(2N/3+1)→OUTN |
| 11 | | | 1000 | | OUT1→OUTN |
| 00 | 0 | 1 | 0000 | 0001 | OUT(N/3)→OUT1 |
| 01 | | | | 0010 | OUT(2N/3)→OUT1 |
| 10 | | | | 0100 | OUTN→OUT1 |
| 11 | | | | 1000 | OUTN→OUT1 |

Table B

FIG. 5

| U/D | | Dyn_en | byp | POS_CH[1:0] |
|---|---|---|---|---|
| 10 | POS'<CS | 0 | 0 | 11 |
| | POS'=CS | 1 | 0 | POS[1:0] |
| | POS'>CS | 0 | 1 | 11 |
| 01 | POS'<CS | 0 | 1 | 11 |
| | POS'=CS | 1 | 0 | POS[1:0] |
| | POS'>CS | 0 | 0 | 11 |

FIG. 10

DISPLAY DRIVING SYSTEM AND DISPLAY DRIVING METHOD

BACKGROUND OF THE INVENTION

1. Field of the Invention

The present invention relates to a display driving system and a display driving method, and particularly relates to a display driving system and a display driving method which can selectively perform a dynamic scan.

2. Description of the Prior Art

For a conventional display, all scan lines are scanned for each time the frame is refreshed. However, image data of some scan lines may not need to be refreshed. Accordingly, such scan mechanism increases the required frame refresh time and wastes power. Thus, a new scan mechanism for a display is needed.

SUMMARY OF THE INVENTION

One objective of the present invention is to provide a display driving system which can perform dynamic scan.

Another objective of the present invention is to provide a display driving method which can perform dynamic scan.

One embodiment of the present invention discloses a display driving system, configured to control a scan operation of a display, comprising: a scan control circuit, configured to receive a start position signal and to generate a switch selecting signal according to the scan start position signal; and a scan switch circuit, coupled to the display and the scan control circuit, and comprising a plurality of switches, configured to turn on one of the switches according to the switch selecting signal, to control the display to start the scan operation at a scan start position; wherein the display comprises N scan lines, wherein the scan start position is one of the scan lines.

Another embodiment of the present invention discloses a display driving method, for control a scan operation of a display, comprising: generating a switch selecting signal according to a scan start position signal by a scan control circuit; and turning on one of switches between the display and the scan control circuit according to the switch selecting signal, to control the display to start the scan operation at a scan start position; wherein the display comprises N scan lines, wherein the scan start position is one of the scan lines.

In view of above-embodiments, a dynamic scan of the display can be selectively performed, rather than limited to scan all pixels lines. Accordingly, the power consumption and the scan time can be reduced.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a schematic diagram illustrating a truth table of the signals illustrated in FIG. 3 and FIG. 4, according to one embodiment of the present invention.

FIG. 10 is a schematic diagram illustrating a truth table of the signals illustrated in FIG. 9, according to one embodiment of the present invention.

DETAILED DESCRIPTION

In the following descriptions, several embodiments are provided to explain the concept of the present application. The term "first", "second", "third" in following descriptions are only for the purpose of distinguishing different one elements, and do not mean the sequence of the elements. For example, a first device and a second device only mean these devices can have the same structure but are different devices.

Figure 1:
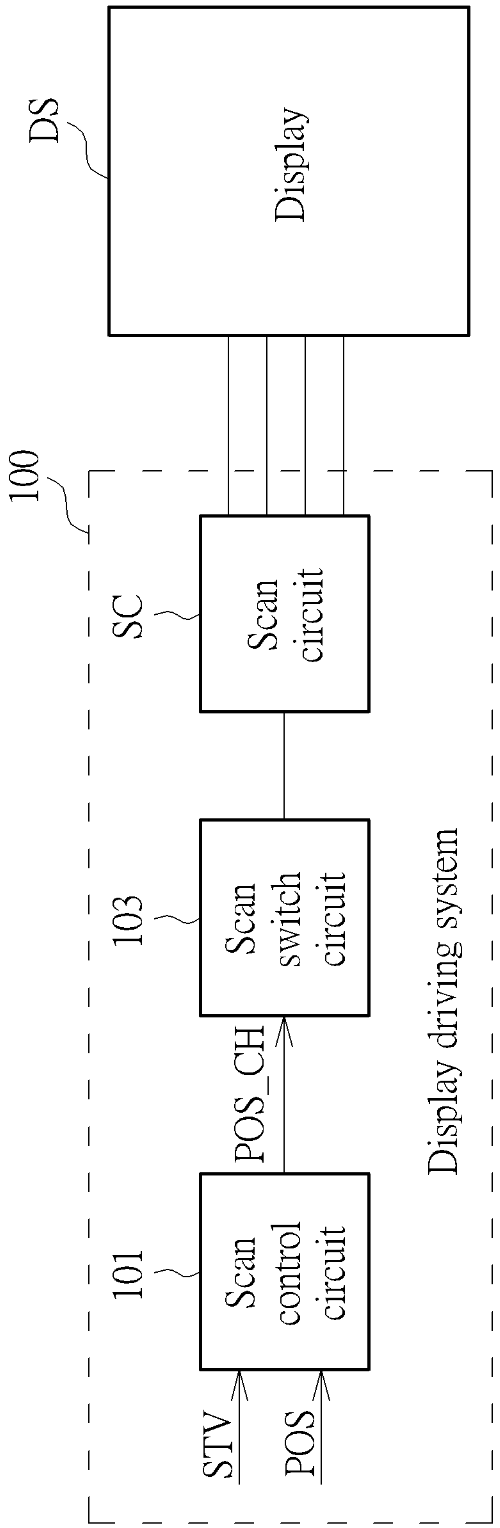
FIG. 1 is a block diagram illustrating a display driving system according to one embodiment of the present invention.

FIG. 1 is a block diagram illustrating a display driving system according to one embodiment of the present invention. As shown in FIG. 1, the display driving system 100, which is configured to control a scan operation of a display DS, comprises a scan control circuit 101 and a scan switch circuit 103. The scan display DS can be any kind of display, for example, an LCD, an OLED display, or an EPD (Electro-Phoretic Display). In the embodiment of FIG. 1, the scan control circuit 101 receives a start position signal POS and generates a switch selecting signal POS_CH according to the scan start position signal POS. The scan switch circuit 103, which is coupled to the display DS and the scan control circuit 101, comprises a plurality of switches. The scan switch circuit 103 turns on one of the switches according to the switch selecting signal POS_CH, to control the display DS to start the scan operation at a scan start position.

For more detail, in one embodiment, the scan control circuit 101 receives the scan trigger signal STV. The scan operation is performed corresponding a specific logic value (e.g., a high logic value) of the scan trigger signal STV. The scan trigger signal STV corresponding to different start positions can be selectively transmitted to the scan circuit SC, via turning on corresponding switches. The scan circuit SC can be provided in the display DS or be integrated in the display driving system 100.

In one embodiment, the display DS comprises N scan lines (pixel rows in following examples). The scan start position is one of the scan lines. In other words, the present invention provides a dynamic scan, in which the scan start position can be any scan line rather than limit to a beginning scan line or a final scan line in the conventional scan operation.

Figure 2:
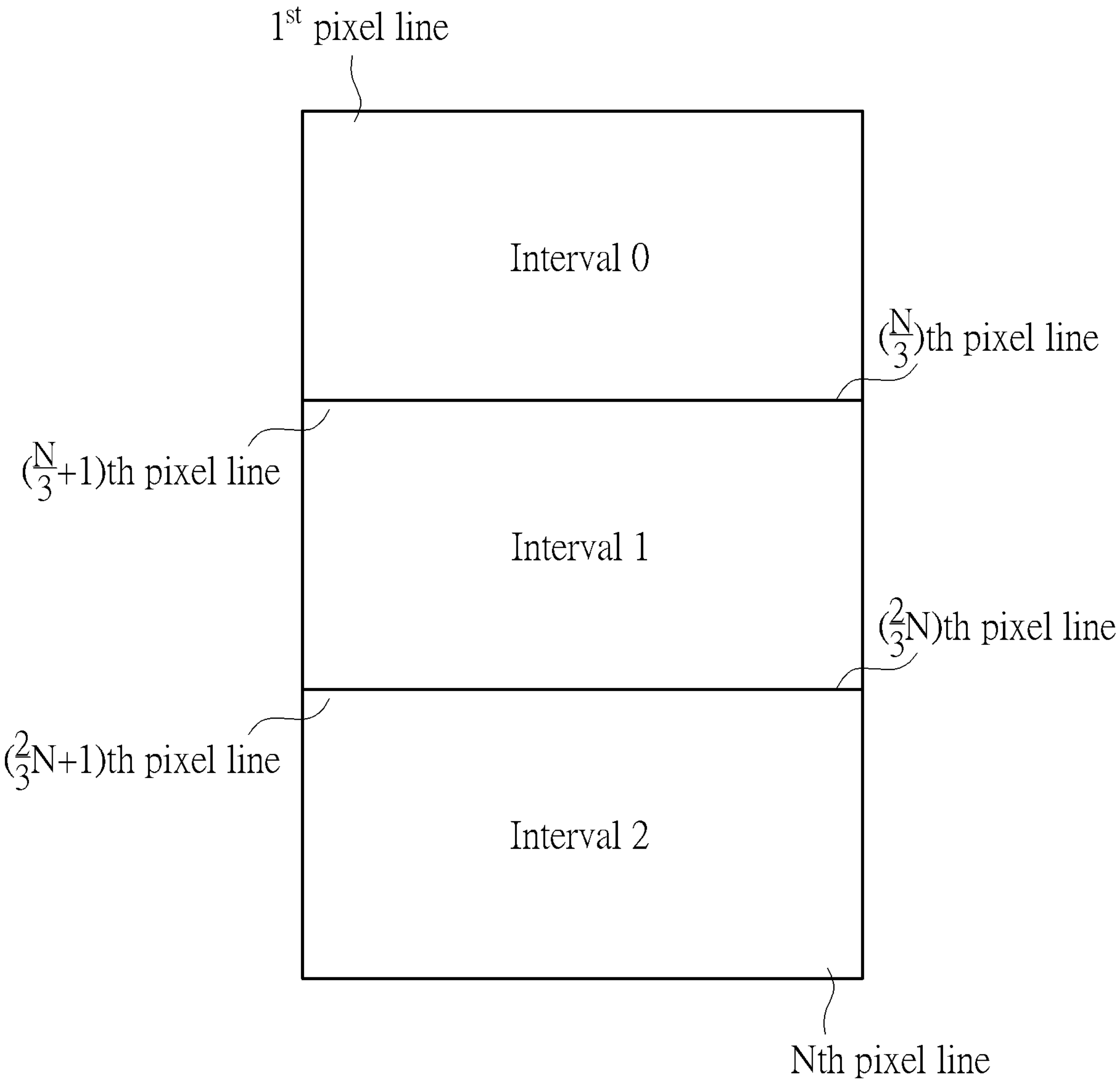
FIG. 2 is a schematic diagram illustrating the dynamic scan performed by the display driving system illustrated in FIG. 1, according to one embodiment of the present invention.

FIG. 2 is a schematic diagram illustrating the dynamic scan performed by the display driving system illustrated in FIG. 1, according to one embodiment of the present invention. As shown in FIG. 2, the scan lines of the display DS can be classified into three intervals (i.e., three parts) which comprises Interval 0, Interval 1 and Interval 2. The scan start position can be one of the $1^{st}$ scan line, the $$\left(\frac{N}{3}+1\right)th$$

scan line and the $$\left(\frac{2N}{3}+1\right)th$$

scan line. If the scan start position is the $1^{st}$ scan line, the scan operation is from the $1^{st}$ scan line to the N-th scan line. Following the same rule, the scan operation may be from the $$\left(\frac{N}{3}+1\right)th$$

scan line to the N-th scan line, or from the $$\left(\frac{2N}{3}+1\right)th$$

scan line to the N-th scan line.

In one embodiment, the scan operation may have two types of scan: a forward scan or a backward scan. For the forward scan, the scan start position can be one of the $1^{st}$ scan line, the $$\left(\frac{N}{3}+1\right)th$$

scan line and the $$\left(\frac{2N}{3}+1\right)th$$

scan line, which are described in above-mentioned descriptions. For the backward scan, the scan start position can be one of the N-th scan line, the $$\left(\frac{2N}{3}\right)th$$

scan line and the $$\left(\frac{N}{3}\right)th$$

scan line. If the scan start position is the N-th scan line, the scan operation is from the N-th scan line to the $1^{st}$ scan line. Following the same rule, the scan operation may be from the $$\left(\frac{2N}{3}\right)th$$

scan line to the $1^{st}$ scan line, or from the $$\left(\frac{N}{3}\right)th$$

scan line to the $1^{st}$ scan line.

The present invention is not limited to the embodiment of FIG. 2. The scan lines of the display DS can be classified into other numbers of parts, and the scan start positions can be set corresponding to these parts. Accordingly, the scan start position of the present invention may be an X-th scan line, X is 1, N, or between 2 to N−1. In other words, the scan operation of the present invention is not limited to start from the $1^{st}$ scan line (a beginning scan line) or the Nth scan line (a final scan line). Also, a scan direction of the scan operation may be from the X-th scan line to a N-th scan line (forward scan) or from the X-th scan line to the $1^{st}$ scan line (backward scan).

Figure 3:
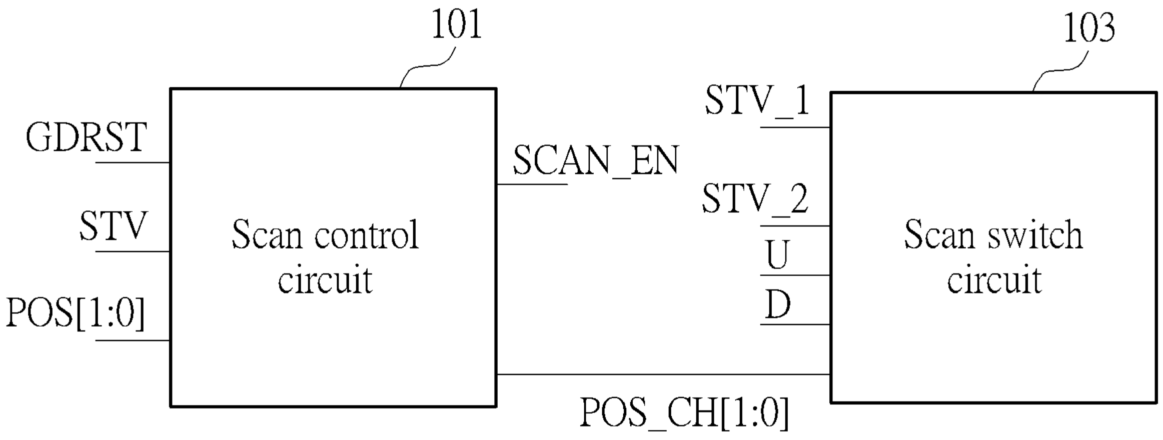
FIG. 3 is a schematic diagram illustrating details of signals of the display driving system in FIG. 1, according to one embodiment of the present invention.

FIG. 3 is a schematic diagram illustrating details of signals of the display driving system in FIG. 1, according to one embodiment of the present invention. In the embodiment of FIG. 3, the scan start position signal POS[1:0] is a two bits digital signal, and the switch selecting signal POS_CH [1:0] is also a two bits digital signal. In the embodiment of FIG. 3, the scan control circuit 101 further receives the above-mentioned scan trigger signal STV and a scan reset signal GDRST. The dynamic scan is triggered by a first logic value (e.g., low logic value) of the scan trigger signal STV and a second logic value (e.g., low logic value) of the scan reset signal GDRST. Additionally, the scan control circuit 101 may further transmit a scan enablement signal SCAN_EN, which can enable or disable the dynamic scan operation. Furthermore, in the embodiment of FIG. 3, the scan switch circuit 103 receives signals STV_1, STV_2 and signals U.D. The signals STV_1, STV_2 have the same values of the signal STV. The signal U is used to trigger the above-mentioned forward scan operation, and the signal D is used to trigger the above-mentioned backward scan operation.

Figure 4:
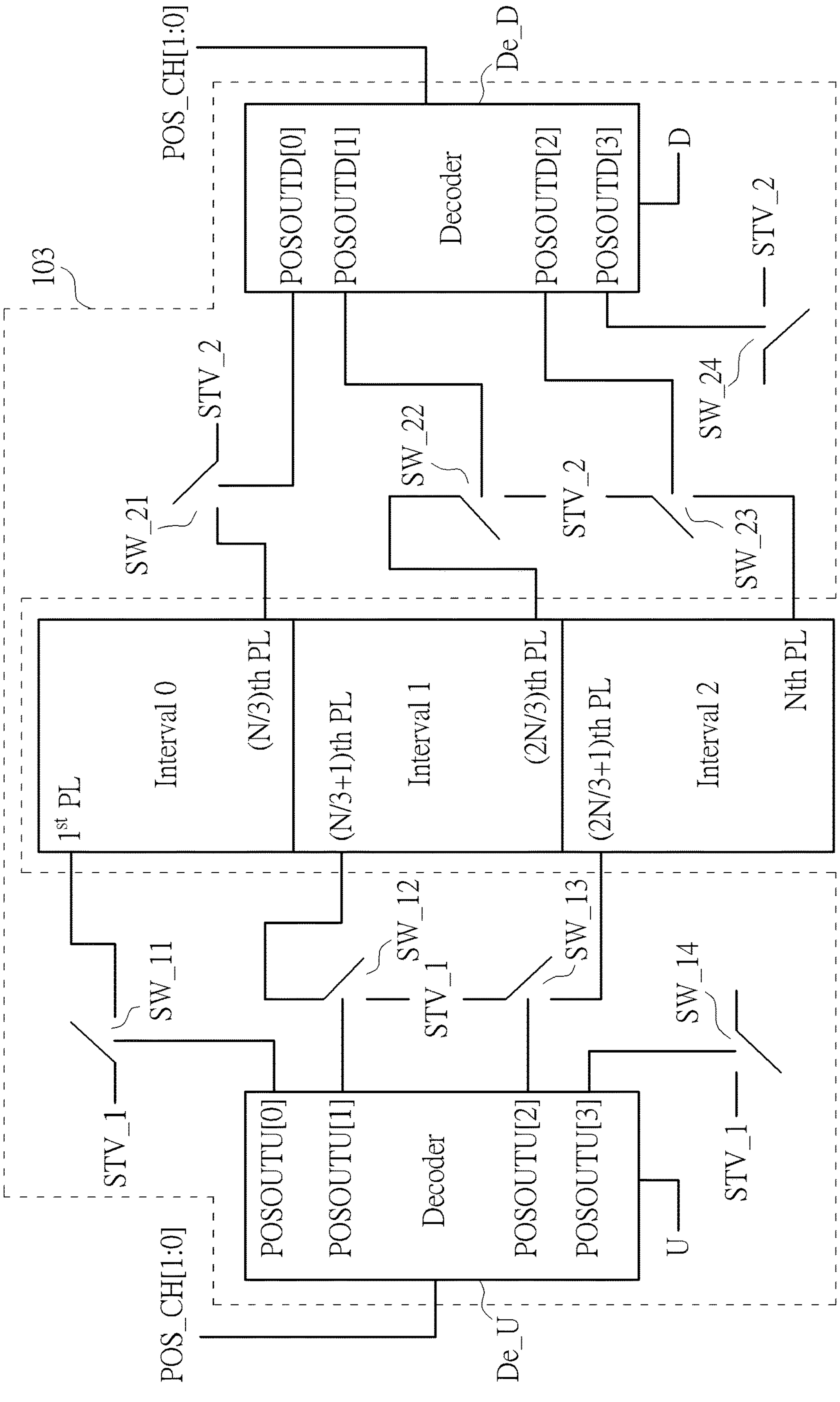
FIG. 4 is a schematic diagram illustrating a detail structure of the scan switch circuit in FIG. 3, according to one embodiment of the present invention.

FIG. 4 is a schematic diagram illustrating a detail structure of the scan switch circuit 103 in FIG. 3, according to one embodiment of the present invention. FIG. 5 is a schematic diagram illustrating truth tables of the signals illustrated in FIG. 3 and FIG. 4, according to one embodiment of the present invention. Please also refer to FIG. 3 and FIG. 4 while referring to FIG. 5, to understand the concepts of the present invention for more clarity.

FIG. 5 comprises two tables: Table A and Table B. The Table A illustrates relations between the dynamic scan and the scan enablement signal SCAN_EN. If the scan enablement signal SCAN_EN=1, it means the dynamic scan is performed to the frame. On the opposite, if the signal SCAN_EN=0, it means the normal scan is performed to the frame. Accordingly, in the example of FIG. 5, the dynamic scan is performed to the $1^{st}$ frame and the normal scan is performed to the $2^{nd}$ frame. Also, the Table B illustrates the signals illustrated in FIG. 3 and FIG. 4.

As shown in FIG. 4, the scan switch circuit 103 comprises decoders De_U and De_D, and switches SW_11-SW_14, SW_21-SW_24. The decoder De_U and switches SW_11-SW_14 are for the above-mentioned forward scan operation, and the decoder De_D and switches SW_21-SW_24 are for the above-mentioned backward scan operation. However, the scan switch circuit 103 can comprise only one group of decoder and switches. For example, the scan switch circuit 103 can only comprise the decoder De_U and switches SW_11-SW_14 or only comprises the decoder De_D and switches SW_21-SW_24.

The decoder De_U is configured to receive the switch selecting signal POS_CH[1:0] to generate switch selecting codes POSOUTU [0]-POSOUTU[3]. The relation between values of the switch selecting signal POS_CH[1:0] and the switch selecting codes POSOUTU [0]-POSOUTU[3] can be set corresponding to different requirements. The switches SW_11-SW_14 selectively turn on corresponding to the switch selecting codes POSOUTU[0]-POSOUTU[3]. As shown in FIG. 5, if the signal U is 1 and D is 0, the forward scan is performed and the backward scan is not performed. In such case, the switch selecting codes POSOUTD[0]-POSOUTD[3] are all 0, thus the switches SW_21-SW_24 all turn off.

The switch selecting codes POSOUTU[0]-POSOUTU[3] shown in FIG. 4 correspond to the switch selecting code POSOUTU[3:0] in FIG. 5. For more detail, the switch selecting code POSOUTU[3] corresponds to the switch selecting code POSOUTU[3:3], the switch selecting codes POSOUTU[3], POSOUTU[2] correspond to the switch selecting code POSOUTU[3:2], the switch selecting codes POSOUTU[3], POSOUTU[2], POSOUTU[1] correspond to the control code POSOUTU[3:1], and the switch selecting codes POSOUTU[3], POSOUTU[2], POSOUTU[1], POSOUTU[0] correspond to the control code POSOUTU [3:0]. Accordingly, if the switch selecting code POSOUTU [3:0] is ABCD, the switch selecting code POSOUTU[3:1] is ABC, the switch selecting code POSOUTU[3:2] is AB, and the switch selecting code POSOUTU[3:3] is A. In such case, the switch selecting code POSOUTU[3] is A, the switch selecting code POSOUTU[2] is B, the switch selecting code POSOUTU[1] is C, and the switch selecting code POSOUTU[0] is D.

In one embodiment, the scan start position signal POS[1:0] and the switch selecting signal POS_CH [1:0] have the same value when the scan enablement signal SCAN_EN=1. Accordingly, if the scan start position signal POS[1:0] is 00, the switch selecting codes POSOUTU[3]-POSOUTU[0] are 0001, thus switches SW_12, SW_13, SW_14 turn off and only the switch SW_11 turns on. Accordingly, the scan start position is the first scan line. If the scan start position signal POS[1:0] is 01, the switch selecting codes POSOUTU[3]-POSOUTU[0] are 0010, thus switches SW_11, SW_13, SW_14 turn off and only the switch SW_12 turns on. Accordingly, the scan start position is the $$\left(\frac{N}{3}+1\right)th$$

scan line. If the scan start position signal POS[0:1] is 10, the switch selecting codes POSOUTU[3]-POSOUTU[0] are 0100, thus switches SW_11, SW_12, SW_14 turn off and only the switch SW_13 turns on. Accordingly, the scan start position is the $$\left(\frac{2N}{3}+1\right)th$$

scan line. If the scan start position signal POS[0:1] is 11, the switch selecting codes POSOUTU[3]-POSOUTU[0] are 1000, thus switches SW_11, SW_12, SW_13 turn off and only the switch SW_14 turns on. In such case, no dynamic scan is performed and a conventional normal operation (i.e., all scan lines are scanned) is performed. Operations of the decoder De_D and switches SW_21-SW_24 are similar and are shown in FIG. 5, thus descriptions thereof are omitted for brevity here.

Figure 6:
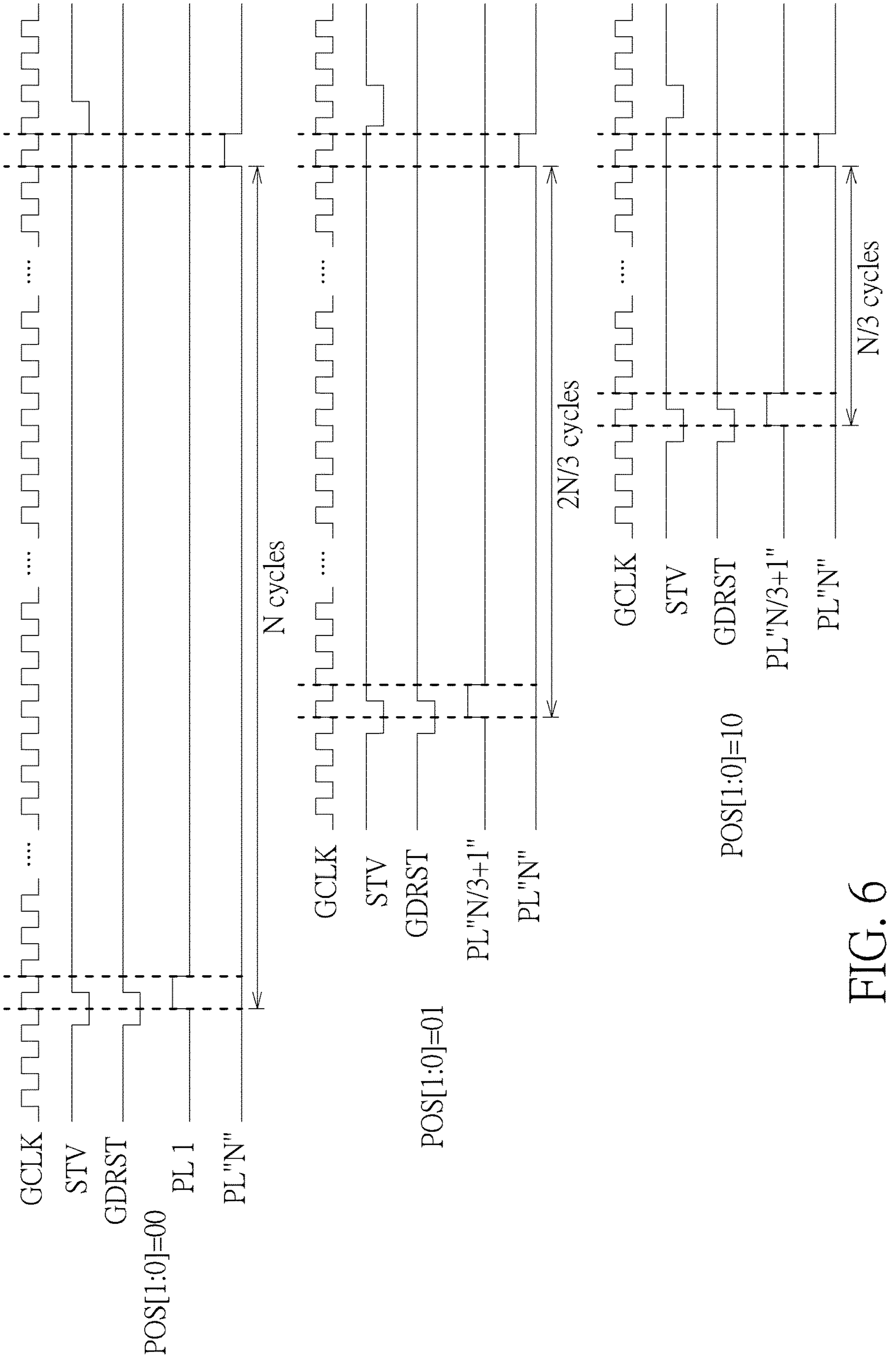
FIG. 6 is a wave chart of signals illustrated in FIG. 3 and FIG. 4, according to one embodiment of the present invention.

FIG. 6 is a wave chart of signals illustrated in FIG. 3 and FIG. 4, according to one embodiment of the present invention. In FIG. 6, the clock signal GCLK is a clock signal used by the scan circuit SC in FIG. 1. signals STV, GDRST are the above-mentioned scan trigger signal STV and the scan reset signal GDRST. As shown in FIG. 6, the scan operations are triggered by the low logic values of the scan trigger signal STV and the scan reset signal GDRST. If the scan start position signal POS[1:0] is 00, the scan start position is the first scan line, thus N scan lines (N channels) are scanned. Also, if the scan start position signal POS [1:0] is 01, the scan start position is the $$\left(\frac{N}{3}+1\right)th$$

scan line, thus $$\left(\frac{2N}{3}\right)$$

scan lines (N channels) are scanned. Additionally, if the scan start position signal POS[1:0] is 10, the scan start position is the $$\left(\frac{2N}{3}+1\right)th$$

scan line, thus $$\left(\frac{N}{3}\right)$$

scan lines (N channels) are scanned.

In FIG. 6, in the above-mentioned embodiments, the scan operations of a whole frame (i.e., all scan lines of the display DS) are controlled by a single scan circuit. However, in another embodiment, the scan operations of a whole frame are controlled by a plurality of scan circuits. For example, if the display DS has a high resolution, a single scan circuit is not fast enough to scan a whole frame in a required time, thus a plurality of scan circuits are needed. Such mode is called a cascade mode.

Figure 7:
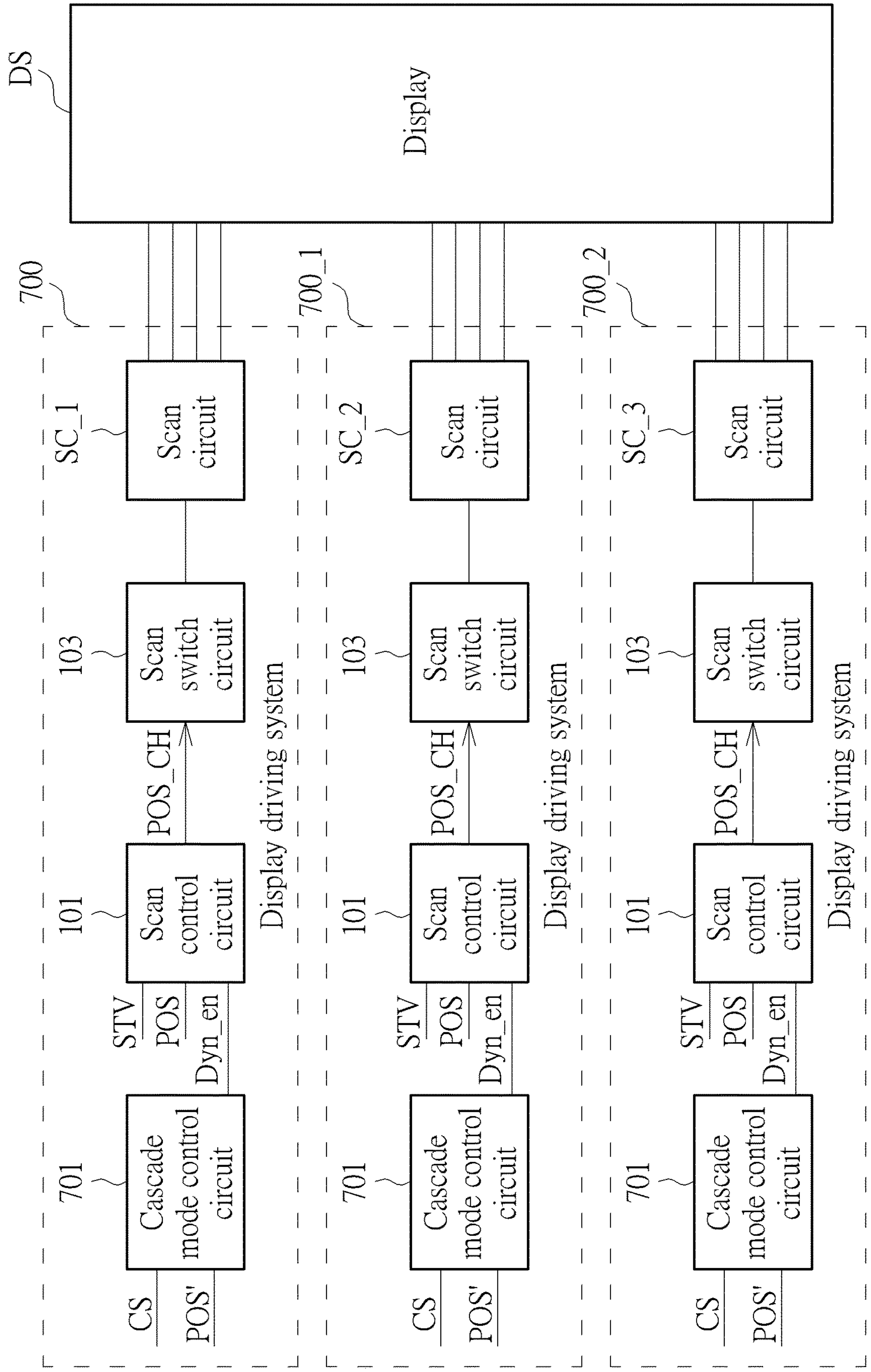
FIG. 7 is a block diagram illustrating a display driving system according to another embodiment of the present invention.

FIG. 7 is a block diagram illustrating a display driving system 700 according to another embodiment of the present invention. As shown in FIG. 7, the display driving system 700 also comprises the above-mentioned scan control circuit 101 and the scan switch circuit 103, and further comprises a cascade mode control circuit 701. In the embodiment of FIG. 7, a plurality of scan circuits are provided (three scan circuits SC_1, SC_2 and SC_3 in this example). Each of the scan circuits SC_1, SC_2 and SC_3 (the first scan circuit, the second scan circuit and the third scan circuit) controls the scan operations of a corresponding part of the scan lines of the display DS. The scan circuits SC_1, SC_2 and SC_3 may be different ICs (integrated circuits), and may be provided in the display DS or be integrated into the display driving system 700. Further, in the embodiment of FIG. 7, each of the scan circuits SC_1, SC_2 and SC_3 corresponds to one of the single display driving systems 700, 700_1 and 700_2. In following descriptions, only the display driving systems 700 is taken as an example for explaining. However, operations of the display driving systems 700_1 and 700_2 can have the same operations of the display driving system 700. Please note, in such case, different display driving systems can be regarded as a single display driving system.

The scan control circuit 101 in FIG. 7 receives a start position signal POS and generates a switch selecting signal POS_CH according to the scan start position signal POS. The scan control circuit 101 in FIG. 7 further receives a dynamic enablement signal Dyn_en generated by the cascade mode control circuit 701 and receives the above-mentioned scan trigger signal STV. The cascade mode control circuit 701 receives a reference signal POS' and a cascade control signal CS. The scan circuits SC_1, SC_2 and SC_3 respectively perform one of the following operations according to a value of the reference signal POS', the switch selecting signal POS_CH and a relationship between the reference signal POS' and the cascade control signal CS: scanning all of the corresponding part (i.e., normal scan), scanning only a portion of the corresponding part (i.e., dynamic scan), and performing none of the scanning operation (i.e., bypass). Details of these operations will be described in following descriptions.

Figure 8:
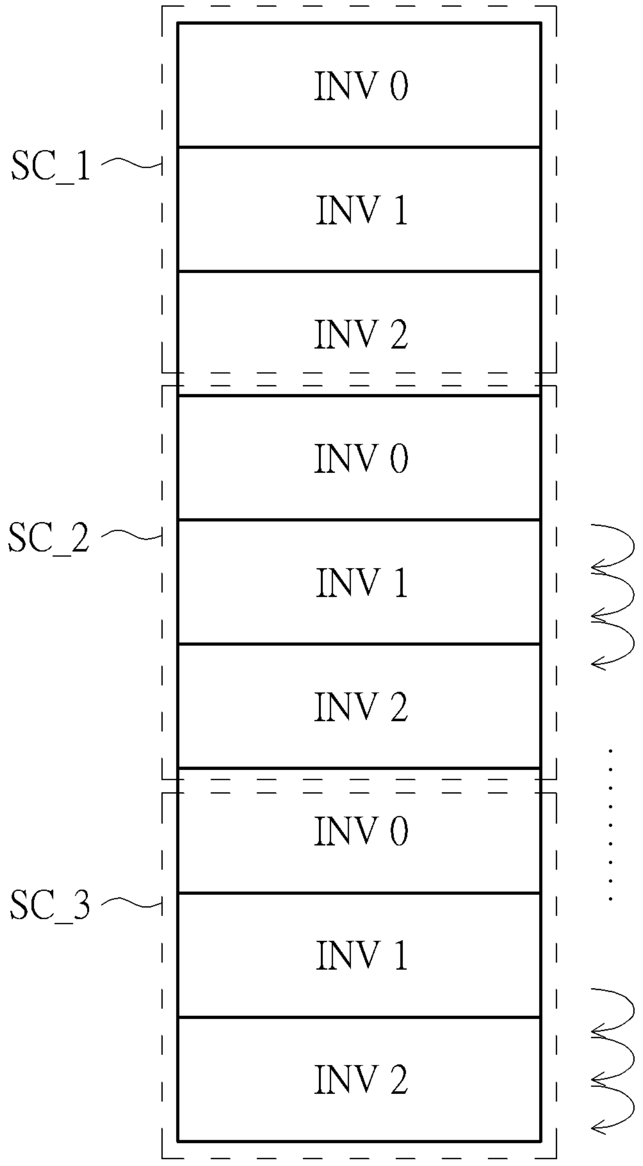
FIG. 8 is a schematic diagram illustrating the dynamic scan performed by the display driving system illustrated in FIG. 6, according to one embodiment of the present invention.

FIG. 8 is a schematic diagram illustrating the dynamic scan performed by the display driving system illustrated in FIG. 7, according to one embodiment of the present invention. As above-mentioned, each of the scan circuits SC_1, SC_2 and SC_3 controls the scan operations of a corresponding part of the display DS. In the embodiment of FIG. 8, display DS also comprises N scan lines. Accordingly, in the embodiment of FIG. 8, each of the scan circuits SC_1, SC_2 and SC_3 controls the scan operations of a portion of a frame (i.e., a portion of N scan lines of the display DS). The portion of the frame is the above corresponding part and comprises three intervals INV2, INV1 and INV0. In the embodiments of FIG. 1-FIG. 5, only the scan start position needed to be selected. However, in the embodiment of FIG. 8, besides the scan start position, one of the scan circuits SC_1, SC_2 and SC_3 is also needed to be selected to perform the dynamic scan.

In one embodiment, the scan circuit SC_3 follows the scan circuit SC_2, and the scan circuit SC_2 follows the scan circuit SC_1. In other words, a corresponding part of the scan circuit SC_3 follows a corresponding part of the scan circuit SC_2, and a corresponding part of the scan circuit SC_2 follows a corresponding part of the scan circuit SC_1. For example, the corresponding part of the scan circuit SC_1 is 1–Xth scan lines of the display DS, the corresponding part of the scan circuit SC_2 is (X+1)th-Yth scan lines of the display DS, and the corresponding part of the scan circuit SC_3 is (Y+1)th-Nth scan lines of the display DS.

In such embodiment, if one of the scan circuits SC_1, SC_3 performs none of the scanning operation (i.e., bypass), the other one scans all of the corresponding part (i.e., normal scan). Further, in such embodiment, the scan circuit SC_2 scans only the portion of the corresponding part (i.e., dynamic scan). For example, the scan circuit SC_1 is bypassed, the scan circuit SC_2 performs the dynamic scan and the scan circuit SC_3 performs the normal scan. Such operation can also be named as the above-mentioned forward scan. For another example, the scan circuit SC_3 is by passed, the scan circuit SC_2 performs the dynamic scan and the scan circuit SC_1 performs the normal scan. Such operation can also be named as the above-mentioned backward scan. It will be appreciated that such embodiment can be used for other applications. For example, if the corresponding part of the scan circuit SC_1 is not the beginning part of the display DS, the scan circuits which the scan circuit SC_1 follows can also be bypassed if the scan circuit SC_2 performs the dynamic scan. For another example, if the corresponding part of the scan circuit SC_3 is not the final part of the display DS, the scan circuits which follow the scan circuit SC_3 may also perform the normal scan if the scan circuit SC_2 performs the dynamic scan.

Figure 9:
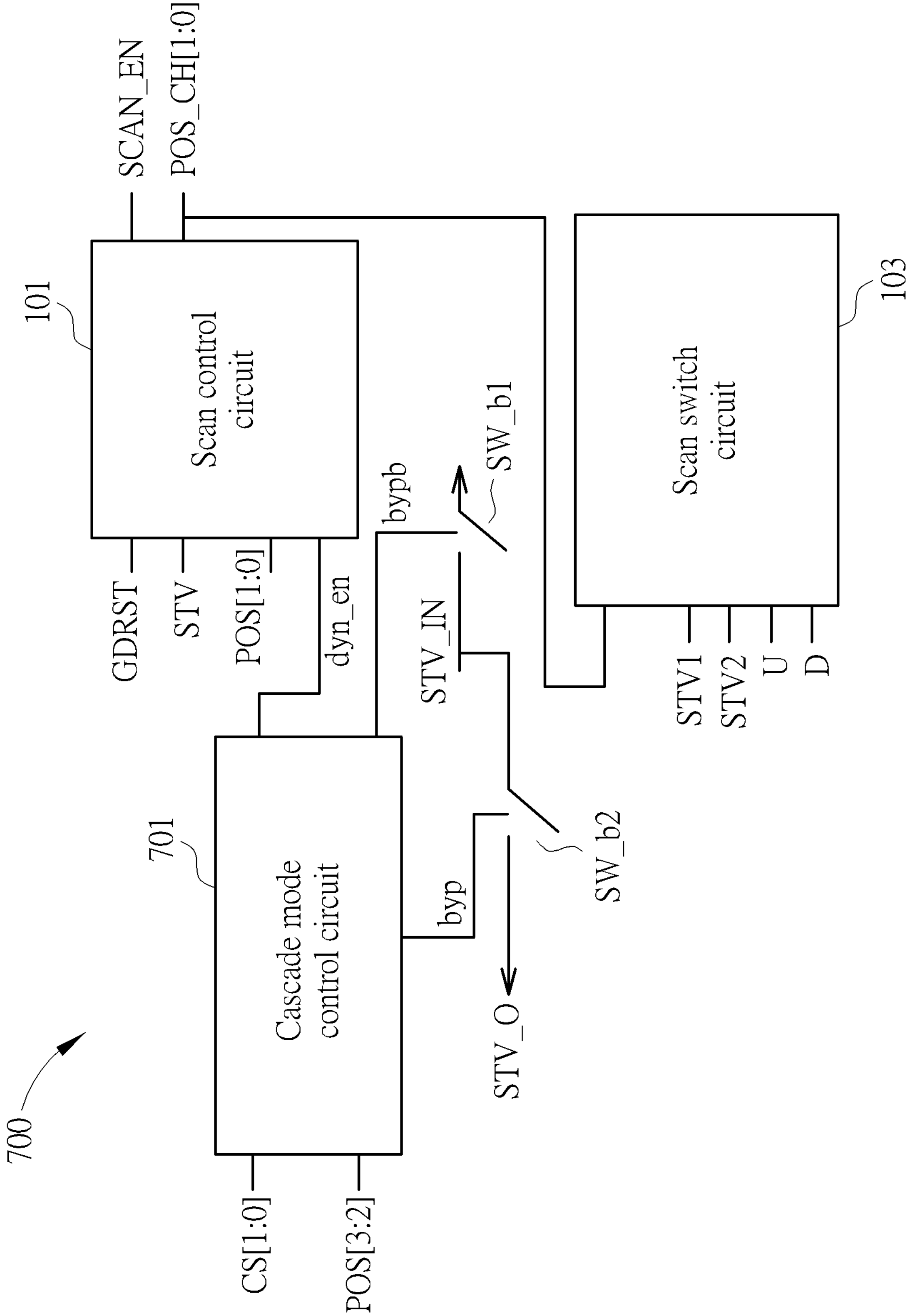
FIG. 9 is a schematic diagram illustrating details of signals of the display driving system in FIG. 7, according to one embodiment of the present invention.

FIG. 9 is a schematic diagram illustrating details of signals of the display driving system in FIG. 7, according to one embodiment of the present invention. FIG. 10 is a schematic diagram illustrating a truth table of the signals illustrated in FIG. 9, according to one embodiment of the present invention. Please also refer to FIG. 7, FIG. 8 while referring to FIG. 9 and FIG. 10, to understand the concepts of the present invention for more clarity.

In the embodiment of FIG. 9, the cascade control signal CS[1:0] is a two bits digital signal and the reference signal POS' POS [3:2] is also a two bits digital signal. As above-mentioned, the scan start position signal POS[1:0] received by the scan control circuit 101 is also a two bits digital signal. Accordingly, in such case, the scan start position signal POS[1:0] are digital signals of a first portion of a specific digital signal POS[3:0], and the reference signal POS [3:2] are digital signals of a second portion of the specific digital signal POS[3:0]. The first portion is for selecting the scan circuit to perform the dynamic scan, and the second portion is for setting the scan start position of the scan circuit selected by the first portion.

The scan reset signal GDRST, the scan trigger signal STV, the start position signal POS[1:0] received by the scan control circuit 101, the switch selecting signal POS_CH[1:0] output by the scan control circuit 101, and the scan trigger signals STV_1, STV_2, signals U, D received by the scan switch circuit 103 are illustrated in above-mentioned descriptions, thus are omitted for brevity here.

As above-mentioned, the scan circuits SC_1, SC_2 and SC_3 operate according to the switch selecting signal POS_CH and a relationship between the reference signal POS' and the cascade control signal CS. In one embodiment, the relationship is a relation of values of the reference signal POS' and the cascade control signal CS. Further, in the embodiment of FIG. 9, the display driving system 700 comprises a bypass circuit which comprises a switch SW_b1 and a switch SW_b2. The switch SW_b1 is controlled by an inverted signal of the bypass signal byp, and the switch SW_b2 is controlled by the bypass signal byp. The bypass circuit is configured to block the scan trigger signal STV to the scan circuit which is supposed to bypass, and configured to transfer the scan trigger signal to the scan circuit which follows the scan circuit which is supposed to bypass (i.e., to the scan circuit which is supposed to perform dynamic scan). In one embodiment, if the scan trigger signal STV_IN is not bypassed by the bypass circuit, the scan trigger signal STV_IN is transmitted to the scan switch circuit 103 as the scan trigger signals STV1, STV2, or STV via the switch SW_b1. On the opposite, if the scan trigger signal STV_IN is bypassed by the bypass circuit, it is transmitted out as the signal STV_O via the switch SW_b2, to a next scan circuit.

As shown in FIG. 10, for the forward scan (U=1, D=0), if a value of the reference signal POS [3:2] is smaller than the cascade control signal CS [1:0], the dynamic enablement signal Dyn_en is 0 and the bypass signal byp is 0. Besides, if the above-mentioned scan enablement signal Scan_en is 0, the dynamic enablement signal Dyn_en is 0 and the bypass signal byp is 0. In such case, the dynamic scan is not performed, and a corresponding scan circuit is not bypassed thus can receive the scan trigger signal STV_IN to perform the normal scan. Also, if a value of the reference signal POS [3:2] and a value of the cascade control signal CS [1:0] are identical, the dynamic enablement signal Dyn_en is 1 and the bypass signal byp is 0. In such case, the dynamic scan is performed, and thus a corresponding scan circuit receive the scan trigger signal STV_IN to perform the dynamic scan. Furthermore, if a value of the reference signal POS [3:2] is larger than a value of the cascade control signal CS [1:0], the dynamic enablement signal Dyn_en is 0 and the bypass signal byp is 1. In such case, the dynamic scan is not performed, and a corresponding scan circuit, which is bypassed, does not receive the scan trigger signal STV_IN.

Examples of the truth table illustrated in FIG. 10 when U/D is 10 are stated as below:

For the scan circuit SC_1, the cascade control signal CS[1:0] is 00 and the specific digital signal POS[3:0] is 0101, thus a value of the POS[3:2](01) is larger than a value of the cascade control signal CS[1:0]. Accordingly, the scan circuit SC_1 is bypassed. For the scan circuit SC_2, the cascade control signal CS[1:0] is 01 and the specific digital signal POS[3:0] is 0101, thus a value of the POS[3:2](01) is the same as a value of the cascade control signal CS [1:0]. Accordingly, the scan circuit SC_2 performs the dynamic scan. For the scan circuit SC_3, the cascade control signal CS[1:0] is 10 and the specific digital signal POS[3:0] is 0101, thus a value of the POS[3:2](01) is smaller than a value of the cascade control signal CS[1:0]. Accordingly, the scan circuit SC_3 performs the normal scan.

In view of above-mentioned embodiments, if the reference signal is a fixed value such as the specific digital signal POS[3:0]. The scan circuit can be controlled to be bypassed, perform the dynamic scan or perform the normal scan via setting the cascade control signal CS.

For the backward scan (U/D=01), the sequence of operations of the scan circuits are opposite, thus the rules are opposite with the operations of the forward scan. For more detail, for the backward scan, the scan circuit SC_3 is bypassed, the scan circuit SC_2 performs the dynamic scan and the scan circuit SC_1 performs the normal scan. Accordingly, for the backward scan, if a value of the reference signal POS [3:2] is smaller than the cascade control signal CS [1:0], the dynamic enablement signal Dyn_en is 0 and the bypass signal byp is 1, thus a corresponding scan circuit is bypassed. Also, if a value of the reference signal POS [3:2] and a value of the cascade control signal CS [1:0] are identical, the dynamic enablement signal Dyn_en is 1 and the bypass signal byp is 0, thus a corresponding scan circuit performs the dynamic scan. Furthermore, if a value of the reference signal POS [3:2] is larger than a value of the cascade control signal CS [1:0], the dynamic enablement signal Dyn_en is 0 and the bypass signal byp is 0, thus a corresponding scan circuit performs the normal scan.

After one of the scan circuits is selected to perform the dynamic scan, the dynamic scan and the normal scan can be performed according to the embodiments illustrated in FIG. 1-FIG. 6, thus operations thereof are omitted for brevity. Please note, in the truth table of FIG. 10, if the switch selecting signal=POS_CH[1:0] is 11, it may the scan circuit is bypassed or performs the normal operation.

Figure 11:
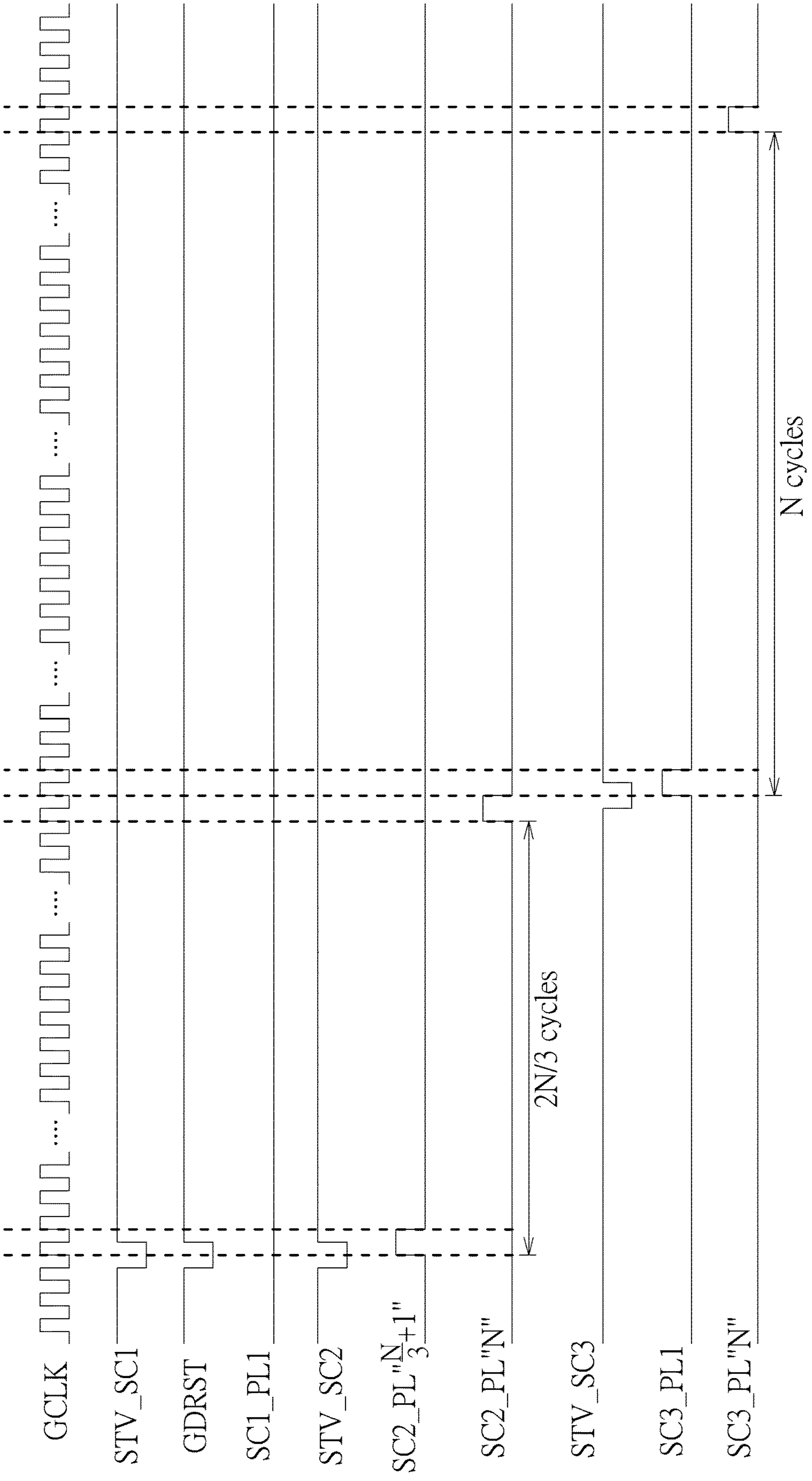
FIG. 11 is a wave chart of signals illustrated in FIG. 9, according to one embodiment of the present invention.

FIG. 11 is a wave chart of signals illustrated in FIG. 9, according to one embodiment of the present invention. In the embodiment of FIG. 11, the display DS has 3N scan lines, accordingly, the scan circuits SC_1, SC_2 and SC_3 respectively controls a corresponding part which has $1^{st}$ scan line to N scan line.

In FIG. 11, the clock signal GCLK is a clock signal used by the scan circuit SC_1, SC_2, SC_3 in FIG. 7. Signals STV, GDRST are the above-mentioned scan trigger signal STV and the scan reset signal GDRST. As shown in FIG. 11, the scan operations are triggered by the low logic values of the scan trigger signal STV and the scan reset signal GDRST. Also, as above-mentioned, the scan circuit SC_1 is bypassed, thus it does not receive the scan trigger signal STV. Moreover, the scan circuit SC_2 performs the dynamic scan, thus the scan operation of the scan circuit SC_2 is triggered by a low logic value of the STV signal received by the scan circuit SC_2 (the STV signal STV_SC2). In the embodiment of FIG. 11, the scan circuit SC_2 scan the $$\left(\frac{N}{3}+1\right)th$$

scan line to the N scan line of a corresponding part thereof. After that, the scan circuit SC_2 performs the normal scan, thus the scan operation of the scan circuit SC_3 is triggered by a low logic value of the STV signal received by the scan circuit SC_3 (the STV signal STV_SC3), to scan N scan lines.

Figure 12:
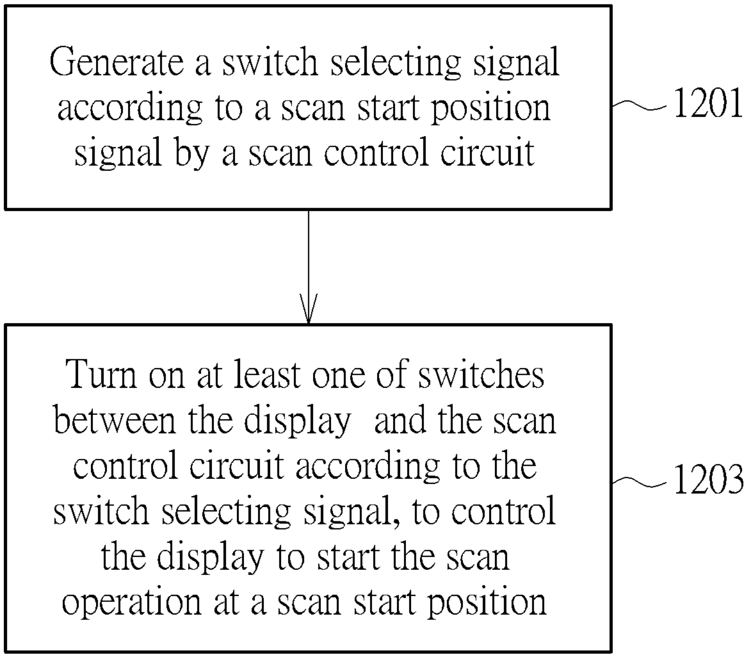
FIG. 12 is flow chart illustrating a display driving method according to one embodiment of the present invention.

In view of above-mentioned embodiments, a display driving method can be acquired. FIG. 12 is a flow chart illustrating a display driving method according to one embodiment of the present invention, which comprises following steps:

Step 1201

Generate a switch selecting signal (e.g., POS_CH in FIG. 1) according to a scan start position signal (e.g., STV in FIG. 1) by a scan control circuit (e.g., the scan control circuit 101 is FIG. 1).

Step 1203

Turn on one of switches between the display (e.g., the display DS in FIG. 1) and the scan control circuit according to the switch selecting signal, to control the display to start the scan operation at a scan start position.

The display comprises N scan lines, wherein the scan start position is one of the scan lines.

Other detail steps can be acquired in view of above-mentioned embodiments, thus are omitted for brevity here.

In view of above-embodiments, a dynamic scan of the display can be selectively performed, rather than limited to scan all pixels lines. Accordingly, the power consumption and the scan time can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display driving system, configured to control a scan operation of a display, comprising:

a scan control circuit, configured to receive a scan start position signal indicating a first scan start position for the scan operation of the display, and configured to generate a switch selecting signal according to the scan start position signal; and a scan switch circuit, coupled to the display and the scan control circuit, and comprising a plurality of switches, configured to turn on one of the switches according to the switch selecting signal, to control the display to start the scan operation at the first scan start position;

wherein the display comprises N scan lines, wherein the scan start position is one of the scan lines, and the first scan start position is dynamically switched for each scan operation of the display.

2. The display driving system of claim 1, wherein the scan start position is an X-th scan line, wherein X is between 2 to N−1.

3. The display driving system of claim 1, wherein the scan start position is an X-th scan line, wherein a scan direction of the scan operation is from the X-th scan line to a N-th scan line or from the X-th scan line to a beginning scan line scan line.

4. The display driving system of claim 1, wherein the scan control circuit further receives a scan trigger signal and a scan reset signal, wherein the scan operation is triggered by a first logic value of the scan trigger signal and a second logic value of the scan reset signal.

5. The display driving system of claim 1, further comprising a plurality of scan circuits, wherein each one of the scan circuits controls the scan operations of a corresponding part of the N scan lines;

wherein the display driving system further comprises:

at least one cascade mode control circuit, configured to receive at least one reference signal and at least one cascade control signal, wherein the scan circuits respectively perform one of the following operations according to the switch selecting signal and a relationship between the reference signal and the cascade control signal:

scanning all of the corresponding part, scanning only a portion of the corresponding part, and performing none of the scanning operation.

6. The display driving system of claim 5, wherein the relationship is a relation of the value of the reference signal and a value of the cascade control signal.

7. The display driving system of claim 5, wherein the scan start position signal are digital signals of a first portion of a specific digital signal, and the reference signal are digital signals of a second portion of the specific digital signal.

8. The display driving system of claim 7, wherein the first portion is for selecting the scan circuit which scans only a portion of the corresponding part and the second portion is for setting the scan start position of the scan circuit selected by the first portion.

9. The display driving system of claim 5, wherein the scan control circuit further receives a scan trigger signal, wherein scan circuits performs the scan operation corresponding to the scan trigger signal, wherein the display driving system further comprises:

at least one bypass circuit, configured to block the scan trigger signal to the scan circuit which performs none of the scanning operation according to the relationship, and configured to transfer the scan trigger signal to the scan circuit which follows the scan circuit which performs none of the scanning operation according to the relationship.

10. The display driving system of claim 5, wherein the scan circuits comprises a first scan circuit, a second scan circuit and a third scan circuit;

wherein the third scan circuit follows the second scan circuit, and the second scan circuit follows the first scan circuit;

wherein if one of the first scan circuit and the third scan circuit performs none of the scanning operation, the other one scans all of the corresponding part;

wherein the second scan circuit scans only the portion of the corresponding part.

11. A display driving method, for control a scan operation of a display, comprising:

generating a switch selecting signal according to a scan start position signal by a scan control circuit, the scan start position signal indicating a first scan start position for the scan operation of the display; and turning on one of the switches between the display and the scan control circuit according to the switch selecting signal, to control the display to start the scan operation at the first scan start position;

wherein the display comprises N scan lines, wherein the scan start position is one of the scan lines, and the first scan start position is dynamically switched for each scan operation of the display.

12. The display driving method of claim 11, wherein the scan start position is an X-th scan line, wherein X is between 2 to N−1.

13. The display driving method of claim 11, wherein the scan start position is an X-th scan line, wherein a scan direction of the scan operation is from the X-th scan line to a N-th scan line or from the X-th scan line to a beginning scan line scan line.

14. The display driving method of claim 11, further comprising:

triggering the scan operation by a first logic value of the scan trigger signal and a second logic value of the scan reset signal.

15. The display driving method of claim 11, further comprising;

controlling a plurality of scan circuits to respectively perform one of the following operations according to the switch selecting signal and a relationship between a reference signal and a cascade control signal:

scanning all of the corresponding part, scanning only a portion of the corresponding part, and performing none of the scanning operation;

wherein each one of the scan circuits controls the scan operations of a corresponding part of the N scan lines.

16. The display driving method of claim 15, wherein the relationship is a relation of the value of the reference signal and a value of the cascade control signal.

17. The display driving method of claim 15, wherein the scan start position signal are digital signals of a first portion of a specific digital signal, and the reference signal are digital signals of a second portion of the specific digital signal.

18. The display driving method of claim 17, wherein the first portion is for selecting the scan circuit which scans only a portion of the corresponding part and the second portion is for setting the scan start position of the scan circuit selected by the first portion.

19. The display driving method of claim 15, wherein the scan circuits performs the scan operation corresponding to a scan trigger signal, wherein the display driving method further comprises:

blocking the scan trigger signal to the scan circuit which performs none of the scanning operation according to the relationship, and transferring the scan trigger signal to the scan circuit which follows the scan circuit which performs none of the scanning operation according to the relationship.

20. The display driving method of claim 15, wherein the scan circuits comprises a first scan circuit, a second scan circuit and a third scan circuit;

wherein the third scan circuit follows the second scan circuit, and the second scan circuit follows the first scan circuit;

wherein if one of the first scan circuit and the third scan circuit performs none of the scanning operation, the other one scans all of the corresponding part;

wherein the second scan circuit scans only the portion of the corresponding part.

* * * * *